Dec. 11, 1945.   S. J. STANLEY ET AL   2,390,560
FLUX RETRIEVER
Filed May 28, 1943

INVENTORS:
SIDNEY J. STANLEY AND
JASON E. WELCH, SR.
BY
ATTORNEYS.

Patented Dec. 11, 1945

2,390,560

UNITED STATES PATENT OFFICE 2,390,560

FLUX RETRIEVER

Sidney J. Stanley and Jason E. Welch, Sr., Turtletown, Tenn.

Application May 28, 1943, Serial No. 488,943

1 Claim. (Cl. 219—8)

This invention relates to improvements in flux retriever and more especially such a device adapted for use in connection with electric welding apparatus.

It is well known that with such apparatus it has been customary to supply an excess amount of flux to the work. Some of this flux was used in the welding process; and the remainder was recovered for further use.

Heretofore, it has been customary to recover the flux by means of a suction hose such as is commonly used with domestic vacuum cleaners. The suction hose was employed to recover the excess flux from the work and deposit it in a bag or suitable container from which it was later removed and put into the feed hopper of the welding apparatus for regular use. This method of recovery required transfer of the flux from the recovery hopper to the feed hopper. One of the features of the invention is the provision of a single hopper operating both as a recovery hopper and a feed hopper, thus making the recovery and use of the flux continuous, so that new flux must be added to the hopper only to replace that which was actually used in the welding process.

The flux employed is ordinarily a granular substance resembling, for example, powdered or granulated borax or other substances or mixtures.

Other features and advantages will appear more fully as we proceed with our specification.

Figure 1:
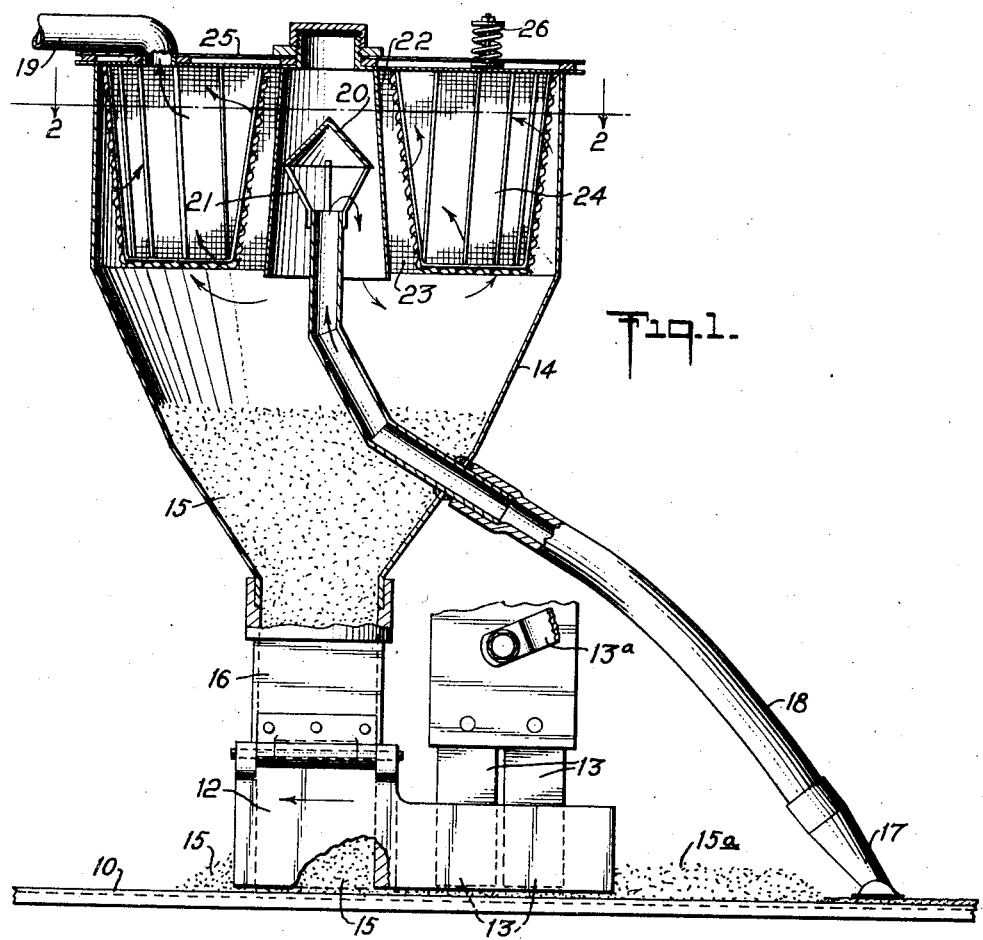
Figure 2:
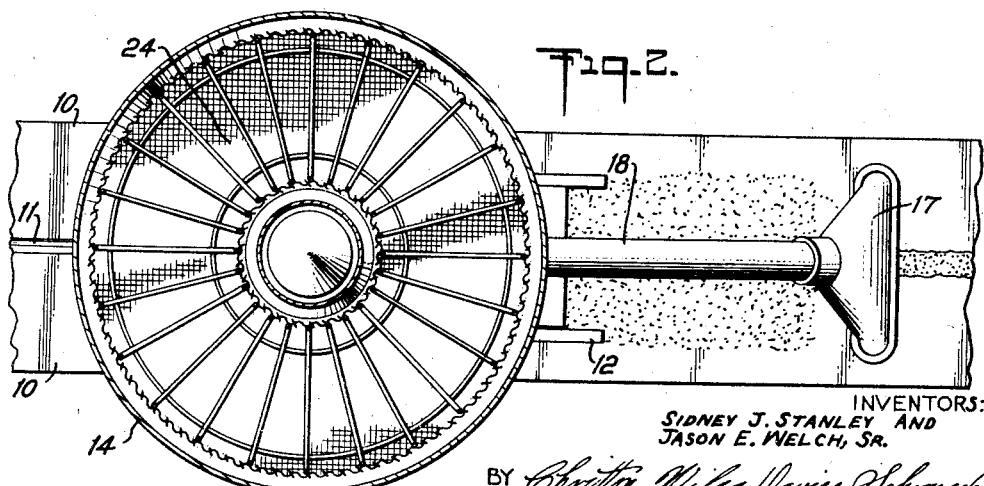

In that form of device embodying the features of our invention, shown in the accompanying drawing, Fig. 1 is a vertical sectional view; and Fig. 2 is a view taken as indicated by the line 2—2 of Fig. 1.

As shown in the drawing, 10 may indicate the work to be welded. For example, this may consist of two plates 10—10 with their edges adjacent each other to form the joint 11 which is to be welded.

The welding apparatus itself is only partially shown as this may be of any well known construction. It is sufficient to indicate here merely the carriage 12, the electrodes 13—13, and the electric supply cable 13a, it being understood that the welding arc is formed between the lower ends of the electrodes 13 and the work itself, the latter forming the other electrode.

14 indicates the feed hopper for the flux 15. This hopper is provided with a gravity feed pipe 16 leading from the bottom of the hopper to the work. In the welding operation the carriage 12 proceeds in the direction indicated by the arrow and an excess of flux 15 is supplied from the hopper through the feed pipe 16 to the work 10. The flux not consumed in the welding operation remains on the work, as indicated by 15a, following the passage of the carriage, and this is sucked up from the work by the nozzle 17 on the suction recovery pipe 18.

19 indicates an air withdrawal pipe at the top of the hopper adapted to be connected to any suitable suction means, not shown, such as, for example, the ordinary suction fan on a domestic vacuum cleaner. The recovery pipe 18 leads to a point near the top of the hopper 14 and is covered by a baffle 20 spaced from the top of the pipe and held in place by the bars 21. This baffle is also preferably covered by another baffle 22 spaced therefrom.

23 indicates an annular screen surrounding the baffle 22 and spaced therefrom, as shown in Figure 1. The suction hose 19 enters the space or chamber 24 inside of this screen 23.

In the operation of the device, sufficient suction is maintained in the pipe 19 to produce sufficient subatmospheric pressure in the top of the hopper 14 to produce a current or flow of air moving upwardly through the recovery pipe 18 with sufficient velocity to withdraw excess flux 15a from the work 10 and deposit it in the hopper 14. The baffles 20 and 22, and the screen 23 prevent the flux from being drawn out of the hopper by the suction pipe 19. The flux is heavy enough so that when it strikes the baffles 20 and 22 it falls downwardly in the hopper on top of the supply therein. It is to be understood that when the current of air leaves the top of the pipe 18 in the hopper it spreads out and its velocity is sufficiently reduced to cause deposit of the recovered flux in the bottom of the hopper 14 so that it is not even drawn upwardly against the screen 23. There is always sufficient flux 15 in the hopper and in the feed pipe 16 to form sufficient weight and sufficient head so that flux is not drawn upwardly from the feed pipe 16 by the subatmospheric pressure in the top of the hopper. It is to be understood that the suction is sufficient to maintain a flow of air through the recovery pipe 18 and cause recovery of flux from the work and deposit of the same in the hopper, but not sufficient to pull up flux from the bottom of the hopper or the feed pipe 16. If the recovery pipe 18 should ever become solidly filled with flux it might be necessary to stop the suction, empty the same, and then start the suction again, being sure that a current or flow of air is continuously maintained through the recovery pipe 18 in order to get the benefit of the dynamic force of such flow of air, and care should be exercised that the nozzle 17 never picks up enough flux 15a to completely clog the same and shut off the flow of air through the recovery pipe 18. It should also be kept in mind that a sufficient amount of flux 15 must be maintained in the feed pipe 16 and in the bottom of the hopper 14 at all times to prevent the suction from drawing any flux up from the feed pipe. If these precautions are observed, there can be continuous use of the machine with continuous recovery of the excess flux through the pipe 18 and deposit of the same in the hopper while simultaneously feeding flux from the hopper through the feed pipe 16 to the work.

At intervals, however, additional new flux must be supplied to the hopper 14. This can be done by removing the cover 25. 26 indicates a cleaner for the cloth screen.

While we have shown and described a certain embodiment of our invention, it is to be understood that it is capable of many modifications. Changes, therefore, in the construction and arrangement may be made without departing from the spirit and scope of the invention as disclosed in the appended claim, in which it is our intention to claim all novelty inherent in our invention as broadly as permissible, in view of the prior art.

What we claim as new, and desire to secure by Letters Patent, is:

In an electrical welding apparatus including a mechanism for feeding a metallic electrode toward metal work for welding, feeding means for supplying flux material to the metal work, said feeding means including a closed internally unrestricted flux hopper having a gravity feed pipe leading from the bottom thereof to the work, a recovery pipe leading from the work to the top of the hopper, and means for producing a vacuum within the hopper sufficient to reclaim material through the recovery pipe without interfering with the feed of flux through the gravity feed pipe.

SIDNEY J. STANLEY.
JASON E. WELCH, Sr.